United States Patent [19]

Read

[11] 4,066,241
[45] Jan. 3, 1978

[54] SEAL MEANS FOR VALVE ASSEMBLY

[75] Inventor: Norman Weldon Read, Dallas, Tex.

[73] Assignee: Dresser Industries, Inc., Dallas, Tex.

[21] Appl. No.: 625,786

[22] Filed: Oct. 24, 1975

Related U.S. Application Data

[63] Continuation-in-part of Ser. No. 548,065, Feb. 7, 1975, Pat. No. 4,022,427, which is a continuation-in-part of Ser. No. 494,424, Aug. 5, 1974, abandoned.

[51] Int. Cl.² ............................................. F16K 11/02
[52] U.S. Cl. ................................................... 251/361
[58] Field of Search ................. 251/DIG. 1, 171, 172, 251/341, 343, 344, 345, 309, 314, 316, 317, 357, 363, 361, 364, 349, 352, 347, 353; 166/226; 137/636, 636.4, 625.17; 285/404

[56] References Cited

U.S. PATENT DOCUMENTS

| | | | |
|---|---|---|---|
| 477,607 | 6/1892 | Pratt | 251/316 |
| 1,817,258 | 8/1931 | Klinger | 251/171 |
| 2,433,732 | 12/1947 | Brown | 251/DIG. 1 |
| 2,821,998 | 2/1958 | Mayhew | 251/317 |
| 2,885,179 | 5/1959 | Hartmann | 251/317 |
| 2,944,566 | 7/1960 | Modrin | 251/317 |
| 2,945,669 | 7/1960 | Gallagher | 251/309 |
| 2,986,367 | 5/1961 | Le Rouax | 251/309 |
| 3,079,124 | 2/1963 | Fawkes | 251/317 |
| 3,186,680 | 6/1965 | Pool | 251/317 |
| 3,189,048 | 6/1965 | Parker et al. | 137/625.17 |
| 3,195,857 | 7/1965 | Shafer | 251/309 |
| 3,314,645 | 4/1967 | Temple | 251/317 |
| 3,387,631 | 6/1968 | Pecis | 137/625.17 |
| 3,788,603 | 1/1974 | Snider | 251/345 |
| 3,895,815 | 7/1975 | Panigati | 251/DIG. 1 |
| 3,916,950 | 11/1975 | Mongerson | 251/361 |

FOREIGN PATENT DOCUMENTS

| | | | |
|---|---|---|---|
| 249,599 | 6/1960 | Australia | 251/361 |
| 31,795 | 10/1970 | Japan | 251/361 |

Primary Examiner—William R. Cline
Assistant Examiner—H. Jay Spiegel
Attorney, Agent, or Firm—Michael J. Caddell

[57] ABSTRACT

An indexing valve assembly utilizes a mandrel having elastomeric seal means retained by a seal housing containing a seal island over which is slidably located a slotted indexing sleeve.

7 Claims, 28 Drawing Figures

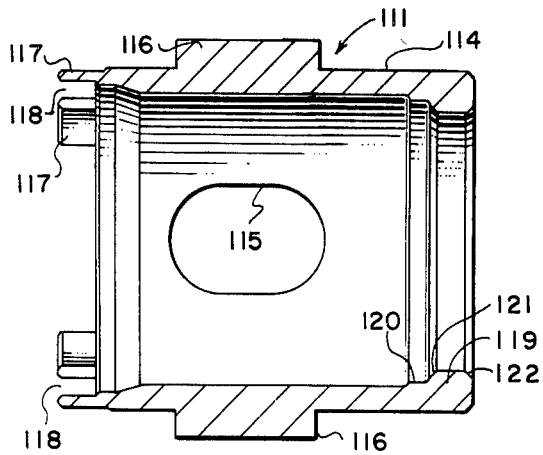
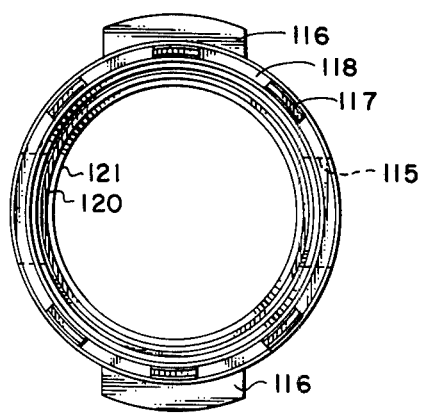
FIG. 2A  FIG. 2B
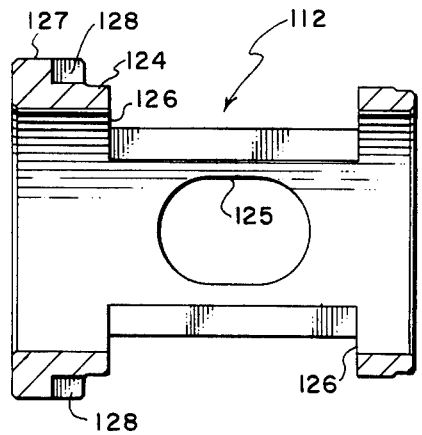
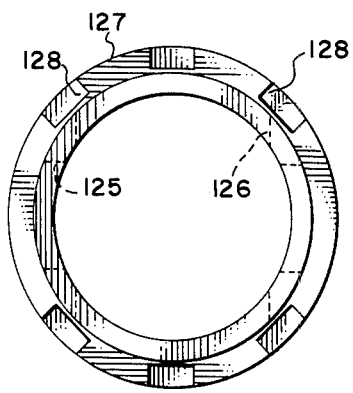
FIG. 3A  FIG. 3B
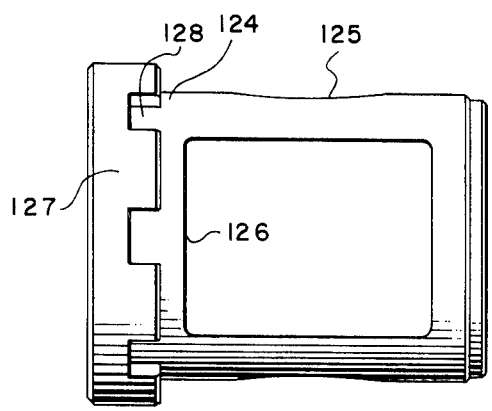
FIG. 3C

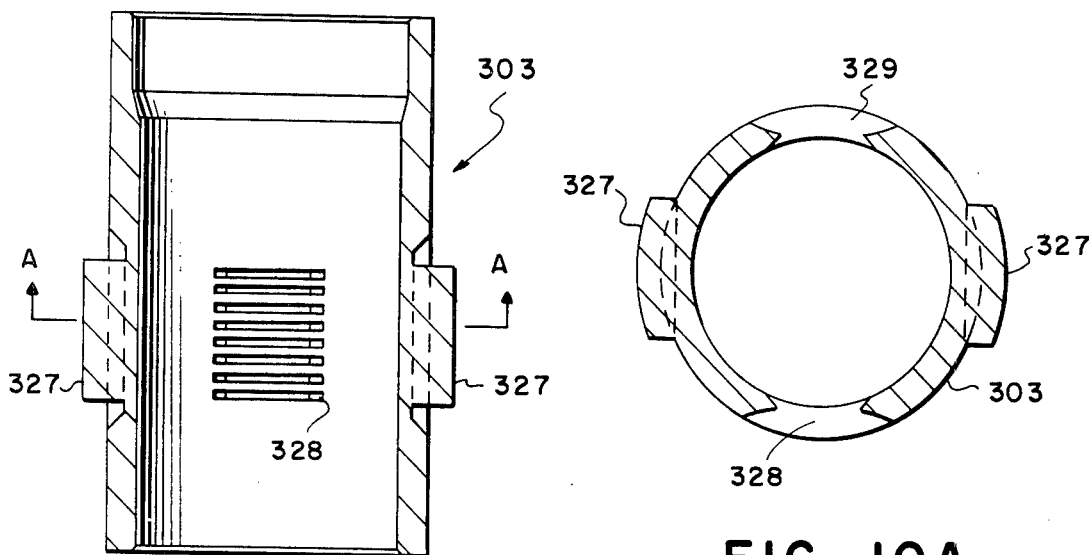
FIG. 10
FIG. 10A
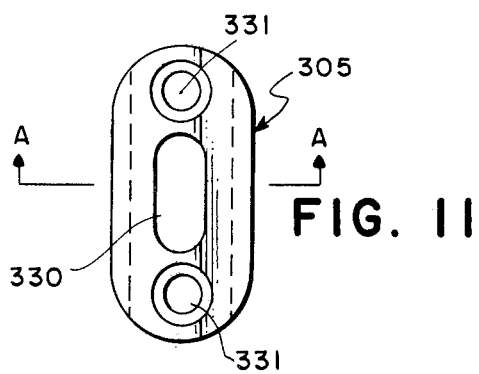
FIG. 11
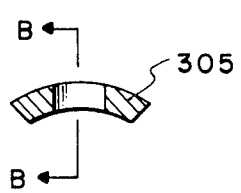
FIG. 11A
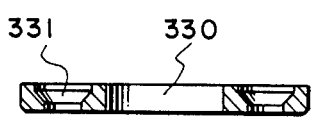
FIG. 11B

4,066,241

SEAL MEANS FOR VALVE ASSEMBLY

CROSS-REFERENCES TO RELATED APPLICATIONS.

This application is a continuation-in-part of an earlier application Ser. No. 548,065 filed Feb. 7, 1975, now U.S. Pat. No. 4,022,427, by Norman Weldon Read, entitled "SLEEVE VALVE MANDREL AND SEAL MEANS FOR INDEXING VALVE ASSEMBLY", which earlier application is a continuation-in-part of an original application Ser. No. 494,424, now filed Aug. 5, 1974 by Norman Weldon Read, entitled "SLEEVE VALVE MANDREL AND SEAL MEANS FOR INDEXING VALVE ASSEMBLY". The above mentioned applications are also related to a prior application by Norman Weldon Read entitled "INDEX EQUALIZING VALVE FOR RETRIEVABLE WELL PACKER", U.S. Pat. No. 3,815,676; which patent is hereby incorporated by reference into this application.

BACKGROUND OF THE INVENTION

This application involves improvements over certain features of the above mentioned patent and patent applications. Specifically this invention provides an improved valve assembly to replace that disclosed in FIGS. 6 and 7 of the incorporated Read patent. Cited portions of the Read patent disclose a valve sleeve having a mandrel with external gudgeon pins and a pair of ports spaced 180° apart around the valve.

An elastomeric seal sleeve is located on the inside surface of the valve sleeve. Although the valve assembly of the Read patent is a significant improvement over the existing art and performs well, it was desirable to obtain a valve assembly having seals with great sealing ability but with reduced resistance to rotation.

This invention provides such a valve assembly by utilizing elastomeric loop seals, which are retained on the seal mandrel by an internal island and by a seal housing slidable onto the seal mandrel.

BRIEF DESCRIPTION OF THE DRAWINGS

FIG. 2A is a side section view of the outer sleeve housing;

FIG. 2B is a top view of the housing of FIG. 2A;

FIG. 3A is a side section view of the inner sleeve housing;

FIG. 3B is a bottom view of the housing of FIG. 3A;

FIG. 3C is a side view of the housing rotated 90° from that of FIG. 3A;

FIG. 10 is a cross-sectional view of the valve sleeve;

FIG. 10A is an axial cross-sectional view taken at line a—a of FIG. 10;

FIG. 11 is a top view of the valve retention island;

FIG. 11A is an end cross-sectional view taken at line a—a of FIG. 11;

FIG. 11B is a side cross-sectional view taken at line b—b of FIG. 11A;

DESCRIPTION OF THE PREFERRED EMBODIMENTS

Figure 1:
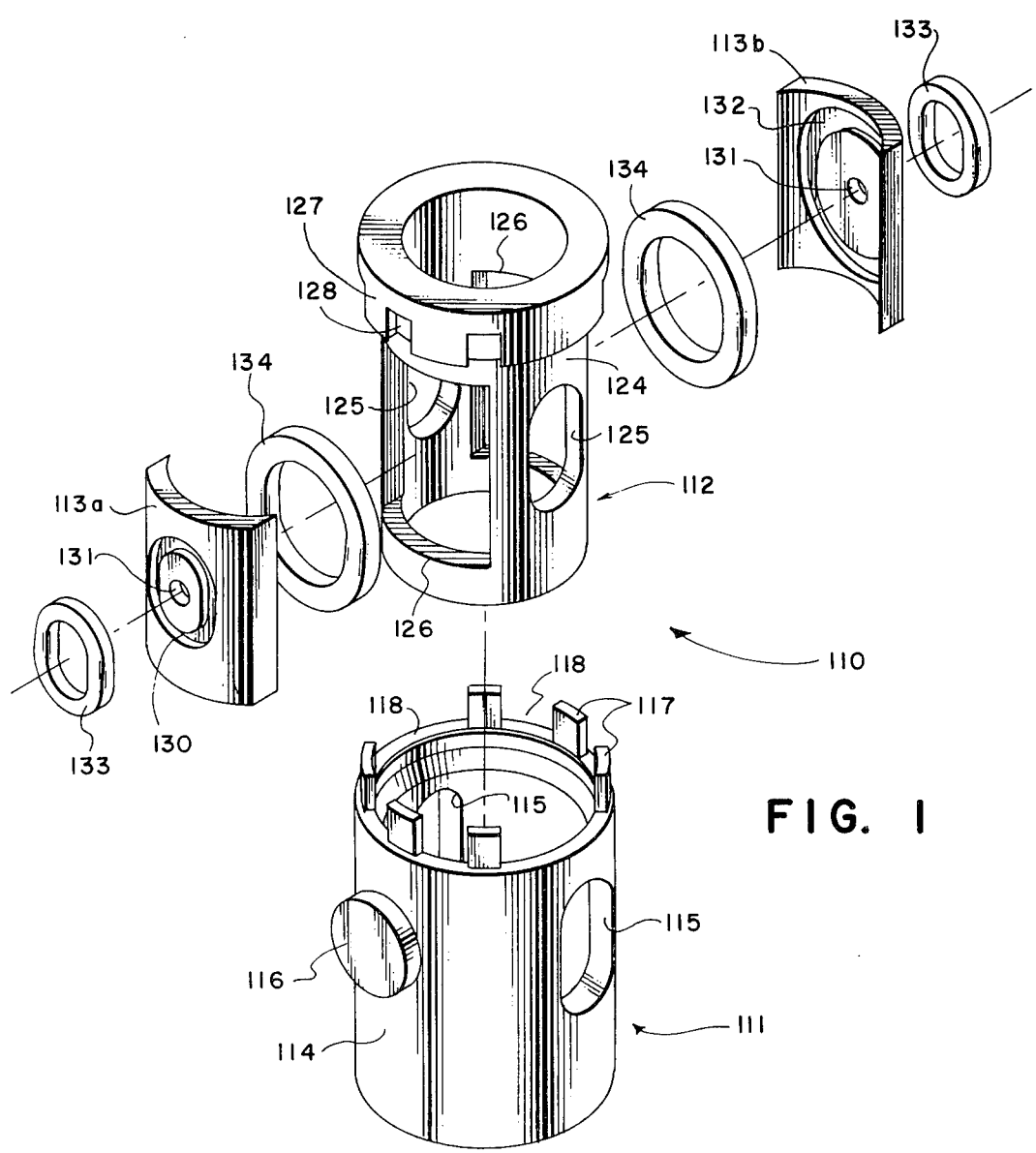
FIG. 1 is an exploded isometric assembly view of the valve assembly showing the relationship of the parts.

The valve sleeve assembly 110 is illustrated in an exploded assembly view in FIG. 1 and comprises an outer seal housing 111, an inner sleeve seal retainer housing 112, and seal inserts 113a and 113b.

Referring to FIGS. 1, 2A and 2B, the outer housing 111 is illustrated as having a generally cylindrical tubular body 114 having two ports 115 through the wall thereof and spaced 180° apart and two gudgeon pins 116 extending radially outward from the body, 180° apart and 90° from the ports 115.

At the top of housing 111 are spaced locking lugs 117 extending upwardly and formed from the wall of body 114 by machining away spaces 118 from the wall. An inner annular stepped flange 119 extends radially inward from the lower end of the wall of body 114. The flange has step 120 and bevelled shoulders 121 and 122.

FIGS. 1 and 3A through 3C illustrate the inner housing and seal carrier sleeve 112 having a generally cylindrical tubular body section 124 with two ports 125 through the wall thereof, spaced 180° apart. Two rectangular seal windows 126 are formed through the wall of body section 124, spaced 180° apart, and rotated 90° from ports 125. FIG. 3C illustrates a full view of one of the windows 126, while FIG. 3A shows a side cross-sectional view through the centerline of the windows.

A raised annular shoulder portion 127 is formed externally on one end of sleeve 112 and contains machined slots 128 extending partially therethrough, matching and complementing the upward extending locking lugs 117 on housing 111.

Figure 4A:
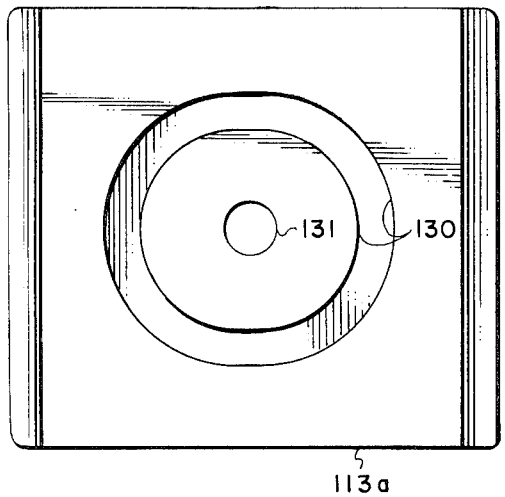
FIG. 4A is an outside front view of one insert seal.
Figure 4B:
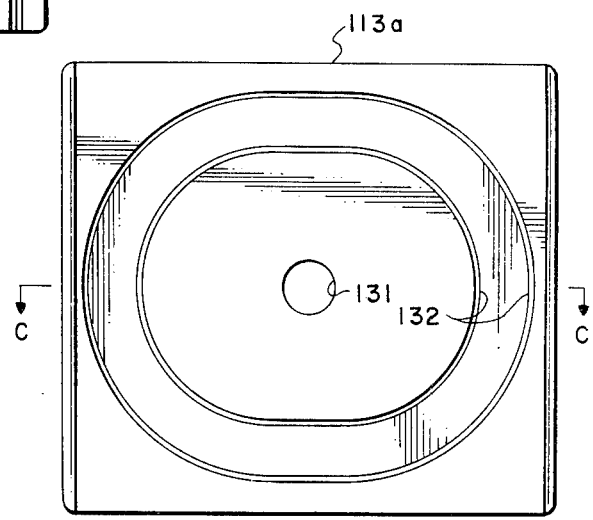
FIG. 4B is an inside front view of an insert seal.
Figure 4C:
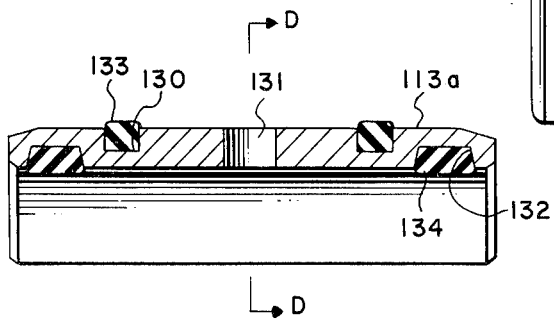
FIG. 4C is a side cross-sectional view of an insert seal taken at line c—c of FIG. 4B.
Figure 4D:
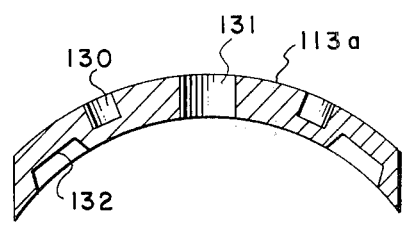
FIG. 4D is an axial cross-sectional view of a seal taken at line d—d of FIG. 4C.

Rectangular arcuate seal inserts 113a and 113b are illustrated in FIGS. 4A through 4D. FIG. 4A shows an outside plan view of the inserts and illustrates an elastomeric seal channel 130 ovally encircling a central port 131 passing through the insert. A similar oval seal channel 132 is formed on the inside of the inserts as illustrated in the inside plan view 4B. A cross-sectional side view of the insert in FIG. 4C and the cross-sectional axial end view of FIG. 4D show the relationship of the seal groove channels in the insert leaf. Broad, flat oval seal member 134 is cemented or bonded in channel 132 as illustrated in FIG. 4C. Seal 133, located in channel 130, may also be cemented or bonded in place if desirable, but this is not required.

When assembled in the indexing valve of the aforementioned Read patent, the valving assembly herein disclosed functions as an integral unit. The rectangular seal inserts 113a and 113b are located, in relatively snug-fitting relationship, in the windows 126 of inner sleeve 112. Sleeve 112 is relatively closely fitted within housing 111 with lugs 117 engaged in locking relationship in matching spaces 128. The inner sleeve 112 and outer housing 111 are maintained in locked relationship by abutment above and below with other portions of the indexing valve mechanism.

The inner seal 134 contacts portion 54 of mandrel 14 of the indexing valve assembly as illustrated in the incorporated Read patent. The outer seal is in constant sealing contact with the inner wall of the outer housing 111.

During the operation of the indexing valve assembly, the ports 59 of mandrel 14 as shown in the Read patent, FIG. 4, are aligned with ports 115 of this valving apparatus 110 and flow through the valve is achieved. When the indexing valve is manipulated to close ports 59, assembly 110 is rotated or "indexed" 90° to place the seal inserts 113a and 113b over ports 59. Seal grooves 132 are made in a large enough oval to completely surround port area 59 and provide sealing capability between ports 59 and the interior of the inserts 113. Since ports 131 through the inserts allow pressure to pass therethrough, the oval seals 133 provide sealing between the inserts and the inner wall of housing 111.

Seals 133 may be left out of the assembly by plugging ports 131 but no pressure balancing is achieved and the pressure force outward or inward on the seal inserts 113 is determined by the entire area of the insert located within seal 134.

In the embodiment shown in FIGS. 4A through 4D, a partial pressure balancing of the seal insert is achieved by transferring pressure through ports 131 to the low pressure side of the insert. The force due to pressure differential is determined by the difference in areas enclosed by seals 133 and the areas enclosed by seals 134.

A complete pressure balance may be achieved by making the enclosed areas within seals 133 equal to the enclosed areas within seals 134. This would mean that portions of the seal grooves 130 and 132 would lie radially in line with each other which would require a much thicker insert to prevent intersection of the two grooves and cutting through of the entire thickness of the insert. This thicker insert may be desirable in instances where the tool inner diameter is not critical and high differential pressures make pressure-balancing necessary. In the present embodiment, one seal groove was made in a smaller oval to fall inside of the radial projection of the other groove and prevent cutting through of the relatively thin insert leaf. This relationship of the seal grooves is clear from studying FIG. 4D. The pressure imbalance from the difference in diameters of the oval seals 133 and 134 is relatively small and is not sufficient to cause high rotational friction between assembly 110 and mandrel 59 of the patented mechanism nor will it cause undesirable extrusion of the elastomeric seal out of its channel.

Figure 5:
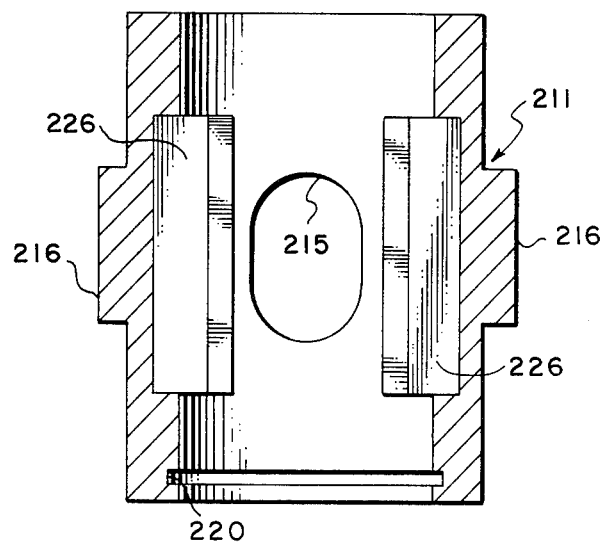
FIG. 5 is a lateral side view of a vertical cross-section of the housing body of an alternate embodiment.

FIG. 5 illustrates a lateral side view in vertical cross-section of the housing body of an alternate embodiment. In this embodiment, the outer housing 111 and seal retainer housing 112 of FIG. 1 have been formed as a single tubular body member 211.

Body 211 is a tubular member adapted for sliding telescopic engagement over a ported mandrel such as that illustrated in FIGS. 1A and 1B of the above mentioned Read patent. Body 211 has a pair of opposed ports 215 passing laterally through the wall thereof. A pair of arcuate seal insert recesses 226 are formed in the inner wall of body 211 spaced opposite from each other and angularly displaced from ports 215. A pair of gudgeon pins 216 extend radially outward from body 211 at 180° spacing from each other and spaced approximately 90° from ports 215.

Recesses 226 are arranged to receive in relatively close-fitting relationship the seal inserts 133a and 133b as illustrated in FIGS. 4A through 4D.

Operation of the assembly is analogous to operation of the first embodiment with the housing 211 operating as would the locked assembly of housings 111 and 112.

The advantages of the present invention include the greatly reduced rotational friction between the valve assembly 110 and the mandrel upon which it rotates. This is because the actual contact area of the elastomeric seals 113 is only a small fraction of the area of the elastomeric seal covering the entire inner bore of the patented mechanism.

This rotational friction is even further reduced by making the seal insert partially or wholly pressure balanced thereby reducing the force holding the seal against the mandrel. Furthermore, the use of the floating type insert seal provides a more flexible and efficient seal against the inner mandrel with just the minimum use of elastomeric material.

Also, the strength of the seal is maximized by having metal support both on the inside edge and the outside edge of each seal. This is provided by the channel in the seal insert which retains the seal and provides the two-way lateral support as well as the radial support. This is an improvement over the large sheath type seal used previously which allowed pressure extrusion and bubbling of the sheath type seal arising from gas penetration through the large seal area.

Referring now to FIGS. 6 through 13, an alternate embodiment of the present invention is disclosed utilizing a loop type seal means wherein improved seal retention means is utilized.

Figure 6:
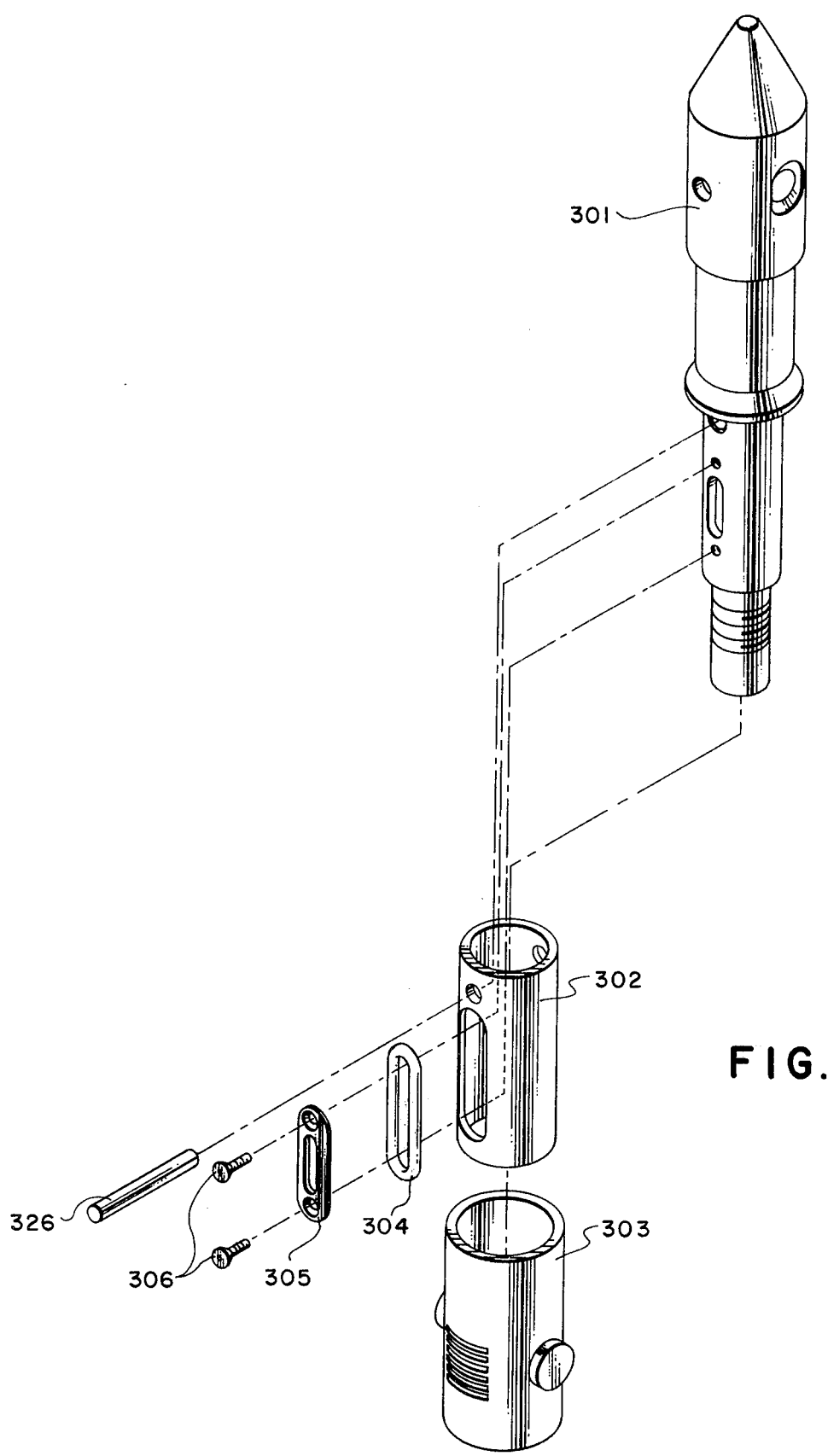
FIG. 6 is an isometric exploded view of an alternate valving assembly.

In FIG. 6 an exploded isometric view of the valve assembly is shown utilizing a valve mandrel 301, a valve sleeve 302, and a valve housing 303. A loop seal 304 is retained within sleeve 302 by an oval seal retention island 305 secured to mandrel 301 by threaded means such as screws 306.

In FIGS. 7A, 7B, 8A, and 8B, the valve assembly of FIG. 6 is shown incorporated into an indexing valve mechanism 310. The indexing valve mechanism 310 is particularly suitable for use with multiple packers and provides an equalizing valving function for equalizing pressures across one or more packers. The valving mechanism 310 comprises a housing 311 attached to the threaded top connection 312 and, at its lower end, having attached thereto a J-slot housing 313 with a J-slot 314 formed on the inner wall thereof.

A J-slot mandrel 315 is located slidably within housing 313 and utilizes a pair of 180°-oriented external lugs 316 slidably engaged in J-slots 314 which are formed 180° apart in the inner wall of J-slot housing 313. The valving mandrel 301 is slidably located within an indexing sleeve 307 which in turn is located within housing 311. Mandrel 310 has an indexing pin 308 passing transversly through the upper end thereof held in place by threaded cap screw 309. Pin 308 extends outwardly from mandrel 301 and engages at each end in indexing slots 320 formed in indexing sleeve 307.

Valve mandrel 301 has at its lower end a reduced section 317 which is partially counterbore to form a flow bore 318 extending to the lower end of section 317. Valve sleeve 302 is located concentrically on section 317, and valve housing 303 is slidably and concentrically located on sleeve 302.

Figure 7A:
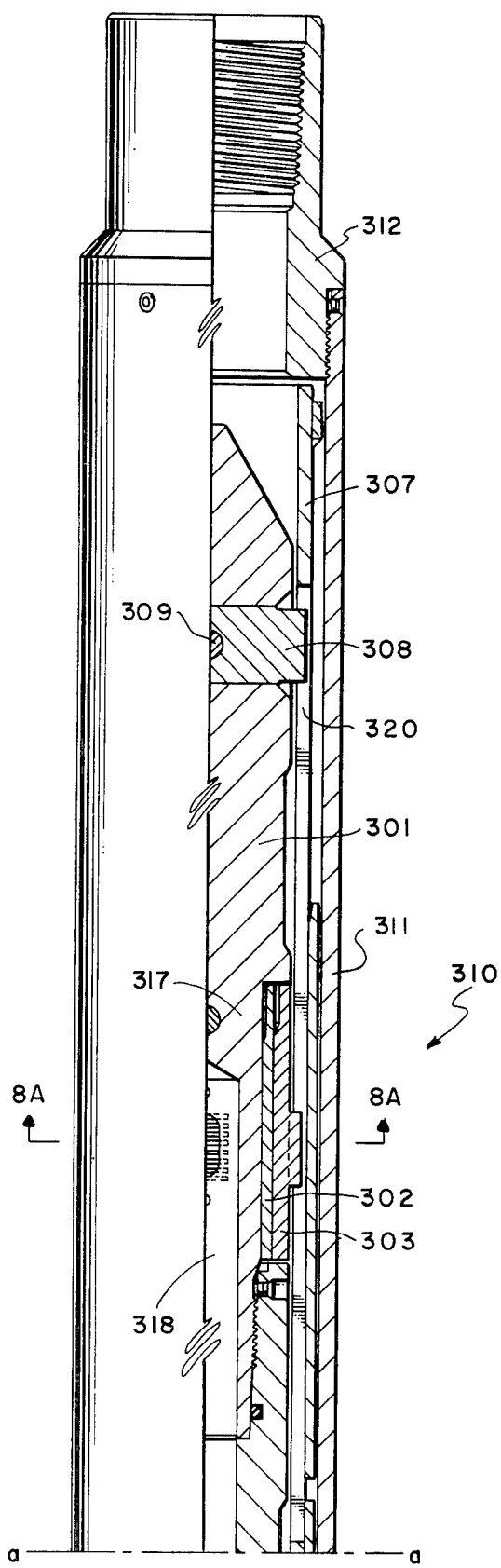
FIGS. 7A and 7B comprise a partial cross-sectional view of the valve mechanism of FIG. 6 in its assembled form.
Figure 8B:
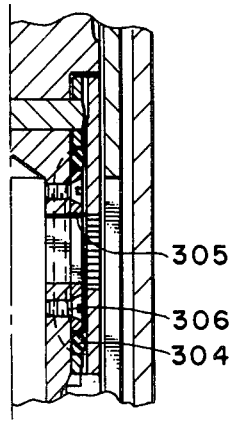
FIG. 8B is a partial cross-section view of the portion of FIG. 7A encircled in dashed line b—b, rotated 90° from the orientation of FIG. 7A.
Figure 8A:
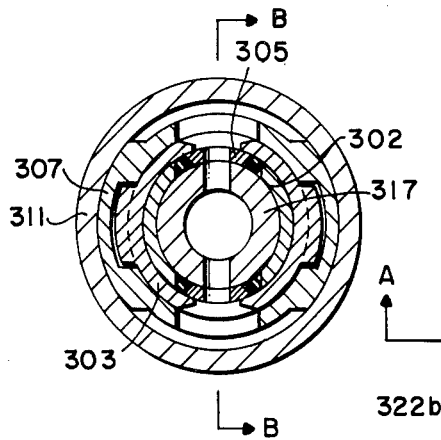
FIG. 8A is an axial cross-sectional view of the assembly of FIG. 7A taken at section line a—a therein.

FIG. 8A is an axial cross-section view taken at line a—a in FIG. 7A further showing the relationships among the valve mechanism elements including mandrel section 317, sleeve 302, housing 303, indexing sleeve 307 and valve housing 311.

FIG. 8B is a lateral partial cross-sectional view of the valving section of mechanism 310 rotated 90° from the FIG. 7A orientation in order to show the porting and sealing elements.

It should be noted that as disclosed in FIG. 8A, the mechanism as illustrated in FIGS. 7A and 8B is symmetric about the longitudinal center line and a complete cross-sectional view would indicate a mirror image of the partial cross-section of FIG. 8B, repeated in identical fashion at 180° therefrom. Operation of the valving mechanism 310 is basically identical to the operation of the mechanism as disclosed in the above incorporated Read patent, U.S. Pat. No. 3,815,676.

Figure 9A:
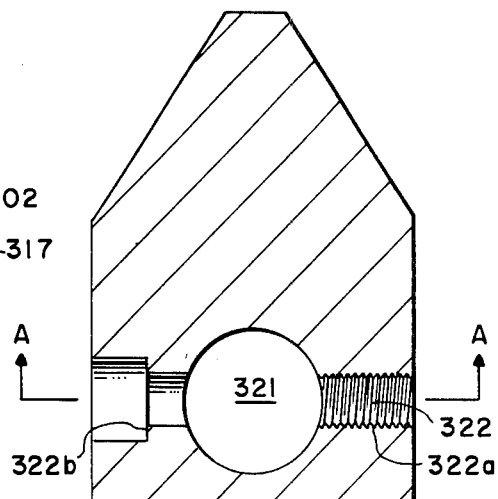
FIG. 9A is an axial cross-sectional view of the mandrel of FIG. 9 taken at line a—a.
Figure 9A:
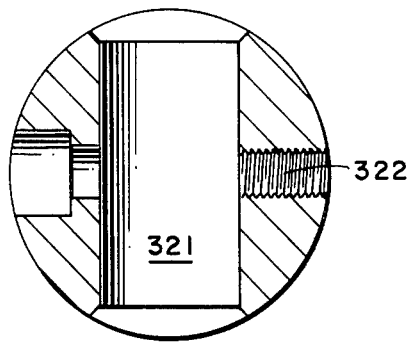
Figure 9B:
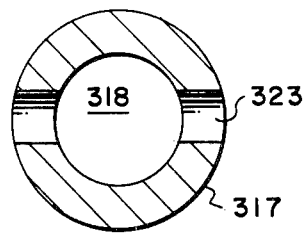
FIG. 9B is an axial cross-sectional view of FIG. 9 taken at line b—b.
Figure 9:
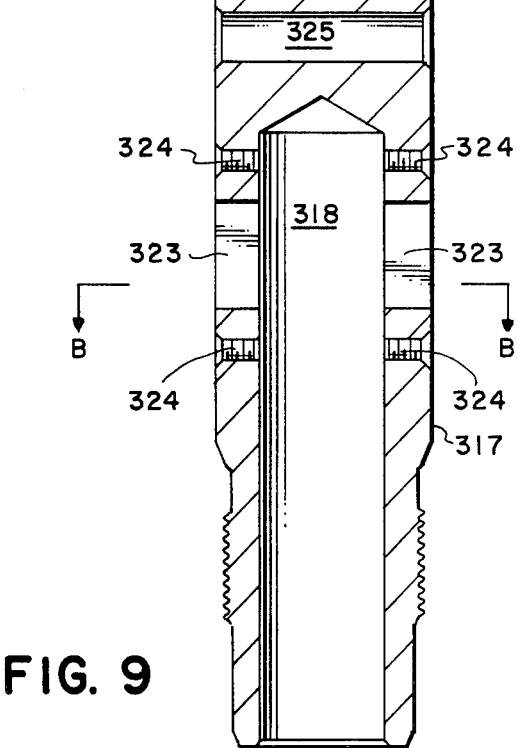
FIG. 9 is a cross-sectional view of the valve mandrel.

FIG. 9 is a cross-sectional view of the valve mandrel 301. The mandrel comprises a generally solid upper section 319 having a transverse lateral bore 321 passing therethrough and adapted to receive an indexing pin 308, as shown in FIG. 7A. A counterbore 322 intersecting bore 321 is provided and has a threaded section 322a and a countersunk portion 322b. Bore 322 is adapted to intersect passage 321 and receive a retention cap screw 309 for securing pin 308 in bore 321.

Mandrel 301 has at its lower half a reduced section 317 which is substantially hollow and contains a generally central bore passage 318 therein. A pair of diametrically opposed flow ports 323 are formed through the wall of section 317 communicating with bore passage 318. Threaded holes 324 are provided near ports 323 for securing the seal retention islands thereto.

A transverse pin bore 325 is provided through the upper end of the reduced section 317 of mandrel 301 and generally intersects the central axis of the mandrel at approximately 90°. Pin bore 325 is adapted to receive an elongated pin 326 as shown in FIG. 6 which pin also passes through aligned holes in sleeve 302 and coacts with mandrel 301 and sleeve 302 to prevent relative movement therebetween.

FIG. 9A is an axial cross-sectional end view of the mandrel 301 taken at line a—a of FIG. 9 and illustrates the intersection of passages 321 and 322.

FIG. 9B is an axial end view cross-section of lower section 317 locking along section line b—b and illustrating ports 323 and flow passage 318.

FIG. 10 is a lateral cross-sectional view taken through the central longitudinal axis of valve housing 303 indicating the indexing lugs 327 formed on opposite sides of the housing. A flow area comprising a plurality of peripheral slit openings 328 is provided at each side of housing 303 between the lugs 327. A corresponding flow area is located opposite flow area 328, 180° around housing 303 as indicated in FIG. 9A at 329.

FIGS. 11, 11A and 11B are close-up illustrations of the seal retention island 305 which provides retention means for the loop seal 304 in the valving mechanism.

It should be noted that the seal structure described with respect to FIGS. 11 through 11B also applies at the opposite side of the mechanism approximately 180° oriented from that illustrated. The opposite seal mechanism is substantially identical to that of FIG. 10 and the description with respect to FIG. 10 is likewise applicable to both seal structures.

While it is not entirely necessary that a dual ported, dual sealing arrangement be utilized, for instance a single ported sealing arrangement can be used, it is preferable to use the dual porting system particularly as illustrated in FIG. 8A to obtain better flow distribution and to simplify the indexing mechanism in the valve structure.

In FIG. 11 the seal retention island 305 is illustrated as an elongated oval plate having an arcute curvature substantially similar to the curvature of valve sleeve 302. The plate 305 is sized to fit within a similar oval opening formed in housing 302 leaving a relatively constant width channel therebetween. Island 305 has a centrally located concentric flow port 330 passing therethrough and has a countersunk screw opening 331 near each end thereof adapted to receive threaded fasteners for attaching the island 305 to mandrel section 317.

Figure 12A:
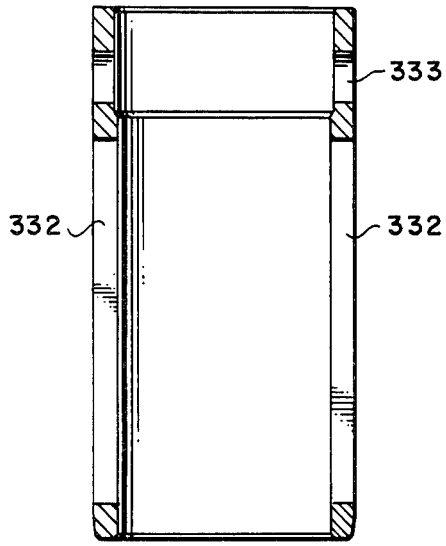
FIG. 12A is a cross-sectional longitudinal view of the housing of FIG. 12 taken at line a—a.
Figure 12:
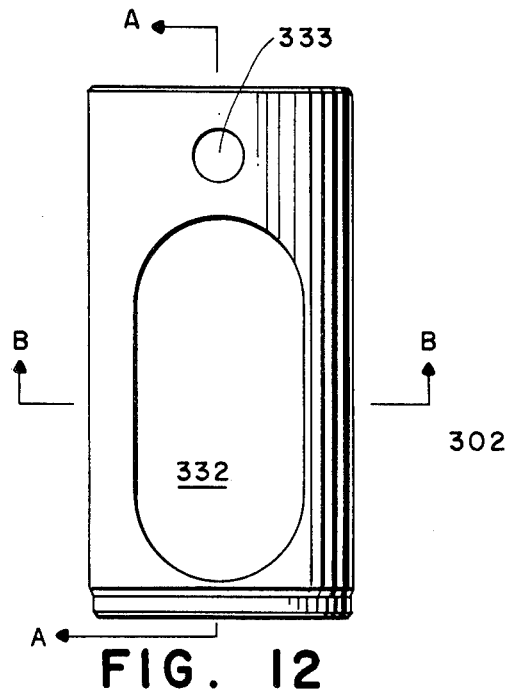
FIG. 12 is a side view of the seal housing.

FIG. 12 illustrates the valve sleeve 302 having a pair of elongated oval slots 332 formed in opposed position passing through the walls of the sleeve. Slots 332 are of sufficient size to allow concentric placement of islands 305 therein with a constant space running peripherally therearound.

Figure 12B:
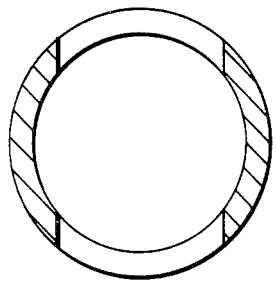
FIG. 12B is an axial cross-sectional view of the housing taken at line b—b of FIG. 12; and, FIG. 13 is a cross-sectional side view of an elastomeric loop seal for use in the valve assembly.

FIGS. 12A and 12B are cross-sectional illustrations of sleeve 302 illustrating the orientation of slots 332 and further illustrating the retention pin openings 333 also passing through the wall of sleeve 302 and adapted for receiving in relatively snug engagement the retention pin 326.

Figure 13:
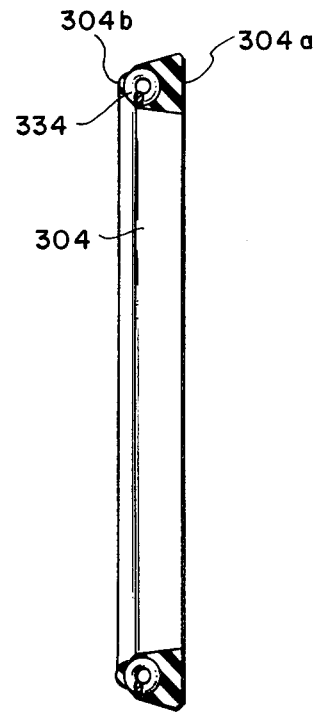

FIG. 13 illustrates a cross-sectional view of one preferred embodiment for the loop seal 304 to be utilized in the valving mechanism. The cross-sectional configuration of the loop seal wall is basically a rounded triangular section having a wide base 304a and an opposed narrowed peak 304b. A tightly coiled spring 334 is encased within the elastomeric material of seal 304.

Assembly of the valving mechanism is accomplished by sliding sleeve 302 upon section 317 of mandrel 301 which preferably fits in a relatively close tolerance, slidable relationship within sleeve 302. The sleeve is moved upward until it abuts the enlarged upper section 319 of mandrel 301. Sleeve 302 is oriented so that slots 332 coincide with ports 323 and openings 333 coincide with pin bore 325 in mandrel 301.

A relatively snug fitting retention pin 326 is then inserted through openings 333 and pin bore 325, thereby securing sleeve 302 against movement with respect to mandrel 301. Preferably the ends of pin 326 are substantially flush with the outer surface of sleeve 302. At this time, loop seals 304 are placed within slots 332 on each side of sleeve 302 and then the retention island 305 are placed inside the loop seals and securedly fastened to section 317 by means of screws 306 engaged in openings 324.

Figure 7B:
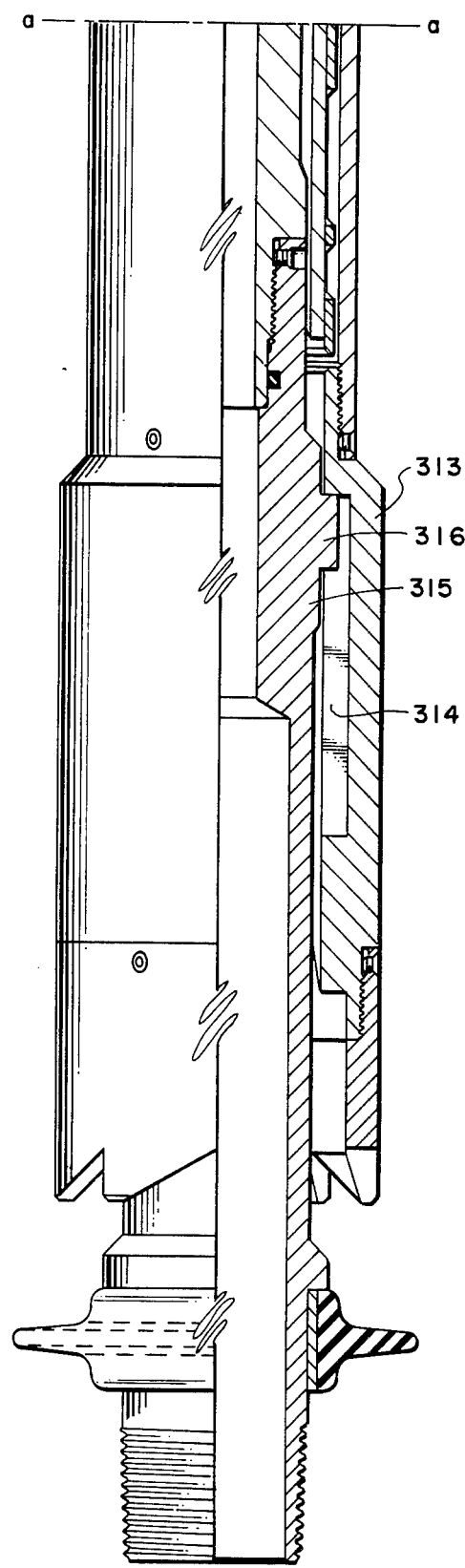

Valve housing 303 is then placed over sleeve 302 in relatively tight fitting slidable relationship thereon with slotted areas 328 substantially coinciding with flow openings 330 in islands 305. The completed valve subassembly is then inserted into the index equalizing valve 310 and secured therein as indicated in FIGS. 7A and 7B, and the operation of the indexing equalizing valve is substantially similar to the operation described in the aforementioned Read patent.

Referring again to FIG. 8A, it can be seen how the tapered walls of island 305 and slots 332 in valve sleeve 302 provide a trapezoidal channel area wider at the base than at the top, which acts as a dovetail channel in retaining the loop seal member in sealing engagement with mandrel section 317.

Valving operation is achieved through the indexed rotational movement of valve housing 303 around valve sleeve 302, alternatly communicating slotted flow areas 328 with flow ports 330 in plates 305. The slotted construction of flow areas 328 and 329 provides additional resistance against extrusion of the loop seals from the peripheral space around plates 305. Closing of the valving system is accomplished by indexing the valve housing 303 90° on sleeve 302 from the orientation of FIG. 7A such that the slotted areas 328 and 329 are no longer in communication with flow ports 330, and loop seals 304 are surrounding flow ports 330 and sealingly engaging the inner wall of housing 303 to prevent fluid communication with bore 318.

Advantages of the present invention include the highly efficient sealing system comprising the loop seal, the seal sleeve and the seal island. The production of the sleeve and the island as separate components, which when combined form a highly effective seal retention channel, is very economical in manufacture as opposed to the complex and expensive method of machining such grooves into the walls of cylindrical bodies.

Furthermore, because of the ease of assembly, the material which can be utilized for the loop seal can be selected from a large range of available materials having a wide range of flexibility, hardness and other properties. This is true also because there is no requirement for bonding the seal to the metal and many elastomeric materials not suitable for bonding to metal can now be utilized in the seal elements.

Furthermore, where the islands have been secured to the mandrel in the description above, it is clear that the islands could be left to float freely on the mandrel inside the loop seals without need for securing them to the mandrel.

Although a specific preferred embodiment of the present invention has been described in the detailed description above, the description is not intended to limit the invention to the particular forms of embodiments disclosed therein since they are to be recognized as illustrative rather than restrictive and it will be obvious to those skilled in the art that the invention is not so limited. For example, whereas elongated oval seal retention means are illustrated, these could be of any suitable shape such as rectangular or circular. Also the cross-sectional configuration of the loop seal body could be circular or any other shape in addition to the triangular configuration described. Furthermore, the loop seals can be made solely of a single elastomeric material or of a combination of different materials including fibers and metal reinforcing.

Locking means other than a transverse pin through the valve sleeve and mandrel could be utilized to lock the two elements together; for instance coengaging teeth or lugs formed on the two elements could be utilized for such locking means. Threaded bolts could be used to lock the sleeve on the mandrel as they do the island plate to the mandrel. Thus, the invention is declared to cover all changes and modifications of the specific example of the invention herein disclosed for purposes of illustration which do not constitute departures from the spirit and scope of the invention.

The embodiments of the invention in which an exclusive property or privilege is claimed are defined as follows:

1. A seal assembly for providing a sealing valve action between two concentric, ported, tubular members, said seal assembly comprising:
    a cylindrical seal carrier sleeve arranged for a snug slidable fit concentrically between two tubular members;
    seal opening means passing through the wall of said carrier sleeve and arranged to be placed in communication with ports in two tubular members;
    elastomeric loop seal means adapted for snug fitting engagement inside said seal opening means and for sealingly engaging two tubular members; and,
    retention island means comprising arcuate plate means having similar surface curvature to that of said carrier sleeve and adapted for equi-spaced placement in said seal opening means in retaining abutment with said loop seal means.

2. The seal assembly of claim 1 wherein said carrier sleeve opening means and said plate means have angled edges adapted to provide a dovetail seal space.

3. The seal assembly of claim 1 further comprising attachment means for removably securing said plate means to an inner tubular member sleeve.

4. The seal assembly of claim 1 wherein said loop seal comprises a closed loop o-ring seal of elastomeric material.

5. The seal assembly of claim 1 wherein said loop seal comprises a closed loop seal member having a generally triangular cross-sectional configuration and further comprising tightly coiled reinforcement means contained within said seal member.

6. A low-torque, high efficiency sealing assembly for providing sealing engagement between two ported, concentric, tubular valve members, said sealing assembly comprising:
    a seal sleeve adapted for close fitting engagement concentrically between two valve members;
    seal member openings through the wall of said seal sleeve arranged to overlay ports in two valve members and having curvilinear configuration with inwardly angled edges;
    elastomeric loop seals abuttingly held in said openings and sealingly engaging two valve members around the ports therein;
    seal retention plates having surface curvature similar to that of said seal sleeve and curvilinear configuration smaller than but similar to that of said openings, and adapted to fit abuttingly in said loop seals; said plates having an angled peripheral edge adapted to form a dovetail channel with said seal sleeve and the inner tubular member; and,
    flow ports through said plates and arranged for being placed in communication with ports in two valve members.

7. The sealing assembly of claim 6 wherein said loop seals each comprise an elastomeric closed-loop seal having a generally triangular cross-sectional configuration and further comprise flexible reinforcing means within said seal made of a material of greater strength than said elastomeric material.

* * * * *

UNITED STATES PATENT OFFICE
CERTIFICATE OF CORRECTION

Patent No. 4,066,241    Dated January 3, 1978

Inventor(s) Norman Weldon Read

It is certified that error appears in the above-identified patent and that said Letters Patent are hereby corrected as shown below:

In column 8, line 31, delete "sleeve".

Signed and Sealed this

Sixteenth Day of May 1978

[SEAL]

Attest:

RUTH C. MASON
Attesting Officer

LUTRELLE F. PARKER
Acting Commissioner of Patents and Trademarks